No. 768,832. PATENTED AUG. 30, 1904.
W. VAN HORN.
NUT OR PIPE WRENCH.
APPLICATION FILED JUNE 10, 1904.
NO MODEL.
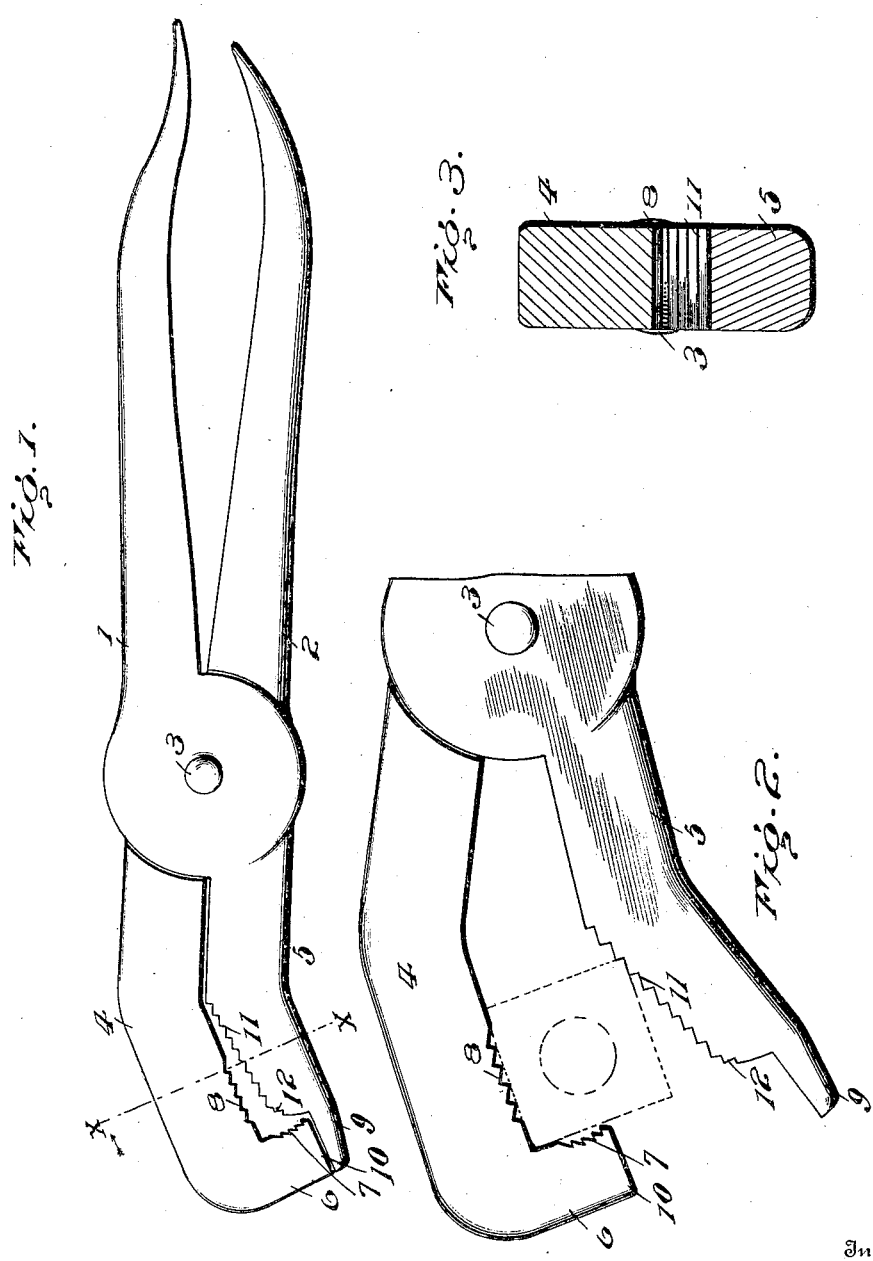
Witnesses
Inventor
W. Van Horn.
By R. A. Lacey, Attorneys No. 768,832.

Patented August 30, 1904.

UNITED STATES PATENT OFFICE.

WILLIAM VAN HORN, OF PIQUA, OHIO, ASSIGNOR OF ONE-HALF TO ELVA A. JACKSON, OF TROY, OHIO.

NUT OR PIPE WRENCH.

SPECIFICATION forming part of Letters Patent No. 768,832, dated August 30, 1904.

Application filed June 10, 1904. Serial No. 212,007. (No model.)

*To all whom it may concern:*

Be it known that I, WILLIAM VAN HORN, a citizen of the United States, residing at Piqua, in the county of Miami and State of Ohio, have invented certain new and useful Improvements in Nut or Pipe Wrenches, of which the following is a specification.

This invention appertains to tools or implements of the plier type for coöperation with nuts or burs and pipes, rods, and like work to be positively rotated, as when tightening or loosening screw-thread joints.

The invention provides a tool of the class aforesaid capable of use with a variety of work differing in size and adapted to positively and securely grip the same without requiring the expenditure of excessive force to cause the jaws to take hold of the work when giving the final turn for tightening or the initial turn for loosening the joint.

The invention consists of the peculiar structural features which hereinafter will be more particularly set forth and finally claimed.

In the accompanying drawings, forming a part of the specification, Figure 1 is a side view of a tool embodying the invention. Fig. 2 is a side view of the jaws, on a larger scale, showing a nut gripped between them. Fig. 3 is a transverse section of the jaws on the line X X of Fig. 1.

Corresponding and like parts are referred to in the following description and indicated in all the views of the drawings by the same reference characters.

In its construction the tool comprises complemental members 1 and 2, pivotally connected at a point between their ends, as shown at 3, said members crossing at the point of their pivotal connection, whereby inward pressure applied to the handle ends 3 of the members will force the jaws 4 and 5 together. Each of the jaws is bent at a point between its ends, so as to bring the outer or gripping ends approximately at an obtuse angle to the members 1 and 2, which is of advantage in the efficiency and convenience of operation of the tool. The terminal portion of the jaw 4 is bent about at a right angle, as shown at 6, so as to form a hook to engage with the corner portion of a nut, as shown in Fig. 2, or to prevent outward displacement of any object that may be gripped between the jaws when the tool is in operation. The angle or inner corner formed between the part 6 and the outer deflected portion of the jaw 4 is plain, so as to engage with the plain sides of a square nut, as indicated in Fig. 2. The inner side of the bent end 6 is made concave and toothed, as shown at 7, to make positive engagement with a pipe, rod, or like work. The inner side of the deflected portion of the jaw is made straight and toothed, as shown at 8, said teeth coöperating with the teeth 7 to prevent slipping of the work or adapted to act solely for the same purpose.

The outer or deflected portion of the jaw 5 terminates in an extension 9, which coöperates with the face 10 of the bent end 6 to form plier members. The inner side of the deflected end portion is straight and toothed, as shown at 11, to make positive engagement with the work. A rounded portion 12 is formed at the outer end of the toothed part 11 and the shoulder formed at the base or inner end of the extension 9 and is toothed, as shown at 12, and is adapted to bite into a pipe or rod or like work arranged in the angular space formed between the part 6 and the outer deflected end of the jaw 4.

When it is required to use the tool in the capacity of pliers, the work is gripped between the extension 9 and the face 10 of the bent end 6. A nut or like object is adapted to have one corner fitted in the angular space formed between the part 6 and the outer portion of the jaw 4 and the diagonally opposite corner engaged by a tooth 11, as indicated in Fig. 2. By having the inner side of the bent portion 6 made concave and toothed, as shown at 7, the teeth are not dulled by coming in contact with a nut or like work gripped by the tool when operating thereon. The rounded and toothed portion 12 at the outer end of the toothed portion 11 is so disposed as to enable the teeth to bite into the work and prevent slipping of the tool thereon when considerable force is required to be exerted either for starting the joint or giving the final turn thereto.

Having thus described the invention, what is claimed as new is—

A wrench or tool of the plier type comprising complemental members crossed at a point between their ends and pivotally connected at the point of crossing and having corresponding end portions extended to form jaws and the outer portion of the jaws similarly deflected at an obtuse angle, one of the jaws having an outer extension and the inner side of its deflected portion straight and toothed and the part between the extension and toothed portion made rounding and correspondingly toothed, and the other jaw having its terminal portion bent about at a right angle and the inner corner made plain and having the inner side of the bent end made concave and toothed and the inner side of the deflected part correspondingly toothed, the parts being constructed substantially as illlustrated for the purposes specified.

In testimony whereof I affix my signature in presence of two witnesses.

WILLIAM VAN HORN. [L. S.]

Witnesses:
C. B. JAMISON,
J. R. MILES.